United States Patent [19]

McCullough et al.

[11] Patent Number: 4,515,907

[45] Date of Patent: May 7, 1985

[54] STYRENE POLYMER FOAM MADE WITH ALPHA-POLYOLEFIN ADDITIVES

[75] Inventors: Thomas W. McCullough, Newark; Bradley D. Stevens, Frazeysburg, both of Ohio

[73] Assignee: The Dow Chemical Company, Midland, Mich.

[21] Appl. No.: 590,381

[22] Filed: Mar. 16, 1984

Related U.S. Application Data

[62] Division of Ser. No. 352,668, Feb. 26, 1982.

[51] Int. Cl.³ ............................ C08J 9/00; B29D 27/00
[52] U.S. Cl. .................................... 521/139; 264/45.5; 264/53; 264/DIG. 69; 521/79; 521/81; 521/146; 521/134; 521/59
[58] Field of Search ............... 521/139, 59, 79, 81

[56] References Cited

U.S. PATENT DOCUMENTS

| | | | |
|---|---|---|---|
| 3,285,865 | 11/1966 | Del Bene et al. | 521/59 |
| 3,398,105 | 8/1968 | Roper et al. | 521/59 |
| 3,520,834 | 7/1970 | Mitzutani et al. | 521/134 |
| 3,657,163 | 4/1972 | Kishikawa et al. | 521/139 |
| 3,743,611 | 7/1973 | Muroi et al. | 521/139 |
| 3,959,197 | 5/1976 | Salyer et al. | 521/139 |
| 3,966,597 | 6/1976 | Omori et al. | 521/139 |
| 4,433,029 | 2/1984 | Senda et al. | 521/139 |

Primary Examiner—Morton Foelak
Attorney, Agent, or Firm—Dan R. Howard; Thomas J. Mielke

[57] ABSTRACT

An improved foamable vinyl aromatic polymer composition and a process for preparing a vinyl aromatic polymer foam having incorporated therein a blend of alpha-olefin polymers are disclosed. The blend of alpha-olefin polymers may be virgin material or a portion of recycle feedstream, the recycle feedstream being prepared from adhesive film faced extruded vinyl aromatic foam laminate scrap. Foam materials having improved solvent resistance, ultraviolet light stability, and adhesive characteristics are prepared from the composition and process.

2 Claims, No Drawings

STYRENE POLYMER FOAM MADE WITH ALPHA-POLYOLEFIN ADDITIVES

CROSS-REFERENCE TO RELATED APPLICATION

This is a divisional of application Ser. No. 352,668, filed Feb. 26, 1982.

BACKGROUND OF THE INVENTION

The present invention relates to improved polyvinyl aromatic foam materials and to improved processes of preparing such foam materials. Particularly, the present invention relates to improved polyvinyl aromatic foam materials having incorporated therein an effective amount of thermoplastic α-polyolefins and to processes of preparing such improved foam materials. More particularly, the present invention relates to improved styrene polymer foam materials having incorporated therein a mixture of one or more ethylene polymer materials and one or more copolymers of ethylene and vinyl acetate and to processes of preparing such improved styrene polymer foam materials. Still more particularly, the present invention relates to improved polystyrene foam materials having incorporated therein an effective amount of thermoplastic α-polyolefins, the source of which is recycled polystyrene foam materials having an α-polyolefin film intimately adhered thereto, and processes for preparing such improved polystyrene foam materials.

The concept of recovering thermoplastic foam scrap and converting such recovered scrap into a material suitable for use in conjunction with virgin thermoplastic polymer to prepare thermoplastic foam is not new.

In U.S. Pat. No. 2,838,801, a continuous process for making vinyl aromatic polymer foam articles is disclosed. The process provides in part for the collection of foam scraps which are then pressed and heated to obtain a dense sintered material. The sintered material is then heated to melting temperatures, devolatilized and returned in a heat plastified and devolatilized form to the process and into admixture with a quantity of virgin thermoplastic vinyl aromatic polymer and a blowing agent to produce a foam from which said foam aritcles might be cut. Vinyl aromatic polymers include polystyrene, polyvinyltoluene and various copolymers of styrene.

In U.S. Pat. No. 4,255,372, a process for producing polyolefin foam materials is disclosed. The process involves, in part, the addition of comminuted and compressed crosslinked polyolefin foam scraps to an amount of raw polyolefin material to form a mixture which is thereafter converted into polyolefin film material. The term "polyolefins" is disclosed as meaning high-pressure or low-pressure polyethylene, copolymers consisting primarily of ethylene as well as mixtures thereof. Such mixtures include ethylene-propylene copolymers, ethylene-butylene copolymers, copolymers of ethylene and vinyl acetate and the derivatives thereof.

In U.S. Pat. No. 3,682,844, expandable polystyrene particles having 0.5–6 percent by weight ethylene-vinyl acetate copolymer distributed through each particle or bead are prepared. The copolymer in finely divided form is dispersed throughout liquid styrene monomer. The expandable polystyrene particles are then formed by suspension polymerization.

In U.S. Pat. No. 3,520,834, the moldability of a foamable polystyrene is disclosed as being improved by incorporating therein a low-density polyethylene resin. Not more than 30 percent by weight, preferably 5–20 percent by weight, of said low-density polyethylene may be admixed with a foamable polystyrene resin to result in a foamable molding composition. It is preferred to premix the foamable polystyrene resin and the low-density polyethylene resin so as to form a uniform mixture thereof before supplying the mixture to an extruder. The density of the low-density polyethylene is from 0.91 to 0.93 grams per cubic centimeter.

In U.S. Pat. No. 3,398,105, a method for producing expanded polystyrene foam having an average cell diameter of less than 95 microns is disclosed. The polystyrene contains evenly distributed therein from 0.01 to 0.5 percent by weight of a finely divided organic resinous polymer and a specific blowing agent mixture. The organic resinous polymers include divinyl benzene/styrene copolymers, Ziegler polyethylene (density 0.945 grams per cubic centimeter) and Ziegler polypropylene. The blowing agent mixture is a mixture of n-pentane and isopentane containing from 30 to 80 weight percent isopentane based on mixture weight.

In U.S. Pat. No. 3,218,373, organic polymeric compositions containing a predominant amount of styrene polymer and lesser amounts of a partially cross-linked polymer of ethylene and a mono-olefinically unsaturated ester monomer selected from the group consisting of vinyl acetate and a lower alkyl acrylate. In preparing such compositions, the patent teaches that it is essential to first lightly cross-link the ethylene vinyl acetate rubber, and then blend it with styrene. Rubbery ethylene-vinyl acetate copolymer compositions containing 15 to 75 percent by weight of vinyl acetate are suitable and those containing 30 to 65 percent by weight of vinyl acetate are preferred for purposes of this reference. In addition, such copolymer compositions containing about 40 to about 55 percent by weight vinyl acetate, based on copolymer weight, are noted as being of special interest. Cross-linking of the ethylene-vinyl acetate copolymer is obtained by heating said copolymer with up to 2.5 percent by weight thereof of an organic peroxide curing agent.

A number of references teach the recovery of thermoplastic foam scrap material for reuse.

In U.S. Pat. No. 3,344,212, waste styrene polymer foam material is first comminuted to discrete particles of approximately uniform size and shape. The resulting particles are coated with a lubricant and then subjected to a stream of superheated steam or other hot inert gas while the particles are agitated to prevent agglomeration. The heat treatment is continued for a sufficient period of time such that the bulk density of the particles increases to a final bulk density between about 15 to 30 pounds per cubic foot. After the particles are cooled, they can be mixed with fresh feed stock and fed to an extruder or other processing device. Suitable lubricants include alkali metal salts of fatty acids; fatty acid amides; fatty acid esters; and fatty acids.

In U.S. Pat. No. 3,607,999, a particulate thermoplastic resinous foam is disposed on a vibrating cooled surface adapted to convey particles away from the point of application. While the particles are adjacent the vibrating surface, radiant heat in a sufficient quantity to cause the particles to collapse and coalesce is applied. The coalesced material is then removed from the vibrating surface, cooled below its thermoplastic temperature and comminuted to a desired particle size. Polystyrene foam particles are suitable for such processing.

In U.S. Pat. No. 3,723,582, a portion of a generally continuous process for manufacturing articles from foamed thermoplastic polymeric resin sheet with a density of no more than about 3 pounds per cubic foot is concerned with recovery and recycle of foam scrap. The foam scrap is collapsed and densified by the application of pressure thereto, without addition of heat, before the blowing agent in the cells of the foam has been replaced by air. The densified scrap is then granulated to a relatively small particle size so that the resultant material has a sufficiently high density for further processing as in an extruder. The process is disclosed as being useful for reclaiming and reusing foamed polystyrene.

In U.S. Pat. No. 3,795,633, scrap thermoplastic foam, e.g., polystyrene foam, is converted into a continuous, i.e., void-free, solid, usable resin using an extruder which has at least one decompression zone to which vacuum is applied. Prior to extrusion, the scrap is suitably particularized, as by grinding, to average particle diameters of about 1 inch or less, desirably about 158 inch or less, preferably in the range of about 1/32 to about ½ inch. Following extrusion the extrudate is cooled, after which it can be pulverized or pelletized. In a preferred embodiment, the particularized scrap is premixed with about 5 to about 50 parts by weight virgin resin pellets prior to its entry into the extruder.

SUMMARY OF THE INVENTION

The present invention is an improvement in a process for preparing polyvinyl aromatic foam material by heat plastifying polyvinyl aromatic material in an extruder, mixing said material with a volatile blowing agent, extruding the mixture into a zone of lower pressure sufficient to expand the extruder mixture with the resultant formation of foam material and cooling said foam material, wherein the improvement comprises:

incorporating into the heat plastified polyvinyl aromatic material a compatible amount of a blend of materials, said blend comprising from about 5 to about 100 percent by weight alpha-polyolefin, based on blend weight, and from about 95 to about 0 percent by weight polyvinyl aromatic material, based on blend weight, whereby a generally uniform, closed cell foam material is produced, the foam material having a generally smooth skin which has improved solvent resistance as compared to a polyvinylaromatic foam material not having incorporated therein the blend of materials.

Also contemplated as being within the scope of the present invention is the above process wherein the blend of materials is prepared by comminuting, heat plastifying and pelletizing thermoplastic recycle material, the recycle material comprising a composite laminated structure, the composite laminated structure comprising a polyvinyl aromatic foam core layer and at least one thermoplastic alpha-polyolefin film layer intimately adhered thereto.

The polyvinyl aromatic foam materials prepared in accordance with the aforementioned processes are also within the scope of the present invention.

Polyvinyl aromatic foam materials of the present invention having incorporated therein an amount of alpha-polyolefin, possess a number of advantages or benefits when compared to polyvinyl aromatic foam materials without alpha-polyolefins incorporated therein. First, the foam materials of the invention have a generally smooth skin which has greater solvent resistance than foams not having incorporated therein an amount of alpha-polyolefin. Second, where the source of recycle material is trim scrap and the like from a composite laminated structure comprising a polyvinyl aromatic foam core layer and at least one thermoplastic alpha-polyolefin film layer intimately adhered thereto, there is no need for a separate delaminating process for removing the alpha-polyolefin film layers. Third, accumulation of a significant amount of essentially useless scrap material is avoided by the incorporation thereof into a polyvinyl aromatic foam material. Fourth, the incorporation of recycle material into polyvinyl aromatic foam material is accomplished not only without significant reduction in many foam physical properties but with improvement in some physical properties.

DESCRIPTION OF THE PREFERRED EMBODIMENTS

Vinyl aromatic polymers suitable for purposes of the present invention include expandable polymers, homopolymers and copolymers derived from vinyl aromatic monomers such as styrene, vinyl toluene, isopropyl styrene, alpha-methylstyrene, nuclear dimethyl styrene, t-butyl styrene, bromostyrene, chlorostyrene, vinyl naphthalene, and the like as well as copolymer prepared by polymerizing a vinyl aromatic monomer together with minor amounts of monomers such as butadiene, isobutylene, acrylonitrile, divinyl benzene, itaconic acid, methyl methacrylate, acrylic acid, methacrylic acid, maleic anhydride and the like. Beneficially, the vinyl aromatic polymer is polystyrene.

For purposes of the present invention, the amount of vinyl aromatic polymer present in the polyvinyl aromatic foam material is suitably from about 85 to about 99.9 percent by weight, based on foam material weight, beneficially from about 90 to about 99.5 percent by weight, based on foam material weight and preferably from about 94 to about 98 percent by weight, based on foam material weight.

Alpha-olefin polymers suitable for purposes of the present invention include homopolymers of ethylene such as low density polyethylene and high density polyethylene, and copolymers comprising ethylene, i.e., at least 70 percent by weight of copolymer weight is ethylene, as well as mixtures thereof. Such mixtures include, for example, ethylene-propylene copolymers, ethylene-butylene copolymers, copolymers of ethylene and vinyl acetate and the derivatives thereof, copolymers of ethylene and acrylic acid esters or the derivatives thereof, copolymers of ethylene and methacrylic acid esters or the derivatives thereof, copolymers of ethylene and higher alkenes having from 3 to 20 carbon atoms (also known as linear low density polyethylene) and the like. Beneficially, the term "alpha-polyolefin" as used herein refers to polymer blends, or mixtures, of two or more of the aforementioned alpha-olefin polymers, provided that one of the alpha-olefin polymers is a copolymer of ethylene and vinyl acetate. Desirably, the term "alpha-polyolefin" means a polymer blend or mixture comprising a copolymer of ethylene and vinyl acetate, low density polyethylene and a copolymer of ethylene and a higher alkene.

The amount of alpha-polyolefin present in the polyvinyl aromatic foam materials prepared in accordance with the present invention is generally a compatible amount, or that amount which may be incorporated into polyvinyl aromatic foam materials without significant reductions in the permeability characteristics of the polyvinyl aromatic foam materials. Accordingly, the amount of alpha-polyolefin incorporated into the polyvinyl aromatic foam material is suitably from about 0.1 to about 15 percent by weight of foam material weight, beneficially from about 0.5 to about 10 percent by weight of foam material weight, and desirably from about 2 to about 6 percent by weight of foam material weight.

The amount of ethylene-vinyl acetate copolymer present in the aforementioned blends or mixtures of alpha-olefin polymers is suitably from about 0.5 to about 40 percent by weight of blend weight, beneficially from about 2 to about 35 percent by weight of blend weight, and desirably from about 5 to about 28 percent by weight of blend weight. The ethylene-vinyl acetate copolymer beneficially has polymerized therein from about 8.5 to about 28 percent by weight of vinyl acetate, desirably from about 10 to about 20 percent by weight of vinyl acetate, based on copolymer weight. The melt index of the ethylene-vinyl acetate copolymers is suitably from about 6 to about 8 decigrams per minute as measured in accordance with American Society for Testing Materials (ASTM D-1238, Condition E).

As used herein, the term "polyethylene" encompasses ethylene homopolymers having a density of from about 0.916 to about 0.965 grams per cubic centimeter (ASTM D-792) and a melt index of from about 0.7 to about 5.5 decigrams per minute (ASTM D-1238, Condition E).

Conventional blowing agents which are often used to foam thermoplastic polymers which are also suitable for use in this invention include gases and volatile liquids at ordinary temperatures and pressures such as the aliphatic or cycloaliphatic hydrocarbons boiling between about $-50°$ C. and $60°$ C., e.g., butane, pentanes and their mixtures with hexane, petroleum ether and mixtures thereof with hexane and cyclohexane; the halogenated hydrocarbon compounds, e.g, $CCl_3F$, $CCl_2F_2$, $CClF_3$, $CClF_2-CCl_2F$, $CClF_2-CClF_2$ and the like; mixtures of any two or more of the above and other conventional liquid and gaseous blowing agents. Also suitable are conventional chemical blowing agents such as dinitrosopentamethylene tetramine, p,p'-oxybis(benzene sulfonylhydrazide), azodicarbonamide, and the like. Blowing agents are usually incorporated in amounts from about 0.05 to about 40 weight percent based on the polymer.

Copolymers of ethylene and higher alkenes, the alkanes having from 3 to 20 carbon atoms, are well-known in the art and are more commonly referred to as linear low density polyethylene. Such copolymers may be prepared in accordance with U.S. Pat. No. 4,076,698, the teachings of which are incorporated herein by reference thereto.

Other ingredients such as flame retardants (ingredients which offer partial flameproofing, it being recognized that most materials which include a flame retardant will burn when exposed to sufficiently high temperatures) antioxidants, antiblock agents, ultraviolet light stabilizers, heat stabilizers, nucleating agents and the like may also be present in the molten admixture of the polyvinyl aromatic materials and the blend of materials together with a blowing agent.

Preparation of polyvinyl aromatic foam materials is well-known in the art as evidenced by U.S. Pat. Nos. 2,450,436; 2,515,250; 2,740,157; 2,774,991; 2,838,801; 3,770,668; 3,897,528; 3,954,929; 3,960,792; 4,146,563; and 4,229,396 the teachings of which are incorporated herein by reference thereto.

A source of recycle material is trim scrap and the like from a composite laminated structure comprising a polyvinyl aromatic foam core layer and at least one thermoplastic alpha-polyolefin film layer intimately adhered thereto. In accordance with the present invention, the recycle material is beneficially comminuted to a suitable particle size, the suitable particle size being about $\frac{1}{2}$ inch in diameter. Following comminution or grinding, the particles are converted into a continuous, or void-free, solid resin mixture by using an extruder which has at least one devolatilizing or decompression zone which is vented to the atmosphere. Following extension, the extrudate is cooled, after which is may be pulverized or pelletized as in U.S. Pat. No. 3,795,633. Beneficially, the recycle material is pelletized for further processing in accordance with the present invention.

Pelletized recycle material is beneficially admixed with virgin polyvinyl aromatic resin to form an admixture prior to heat plastifying the virgin resin. The amount of recycle material admixed with virgin resin is suitably sufficient to add a compatible amount, as hereinabove defined, of alpha-polyolefin to the admixture which is then heat plastified and foamed.

The thermoplastic alpha-polyolefin film layer intimately adhered to the polyvinyl aromatic foam core layer beneficially comprises a film layer and a glue layer. The film layer is beneficially prepared from a blend of film-forming alpha-olefin polymers which comprises low density polyethylene and a copolymer of ethylene and a higher alkene. The glue layer beneficially comprises a copolymer of ethylene and vinyl acetate having polymerized therein from about 8.5 to about 28 percent by weight vinyl acetate based on copolymer weight.

In accordance with the present invention, the alpha-polyolefin is suitably a mixture of olefin polymers. The mixture beneficially comprises from about 0 to about 40 weight percent, based on mixture weight, of a copolymer of ethylene and vinyl acetate having polymerized therein from about 8.5 to about 28 percent by weight vinyl acetate based on copolymer weight. The mixture also beneficially comprises from about 100 to about 60 weight percent, based on mixture weight, of a polymer blend of ethylene homopolymers and copolymers. The polymer blend suitably comprises from about 68 to about 75 weight percent of a copolymer of ethylene and a higher alkene having from 3 to 20 carbon atoms, based on polymer blend weight and from about 32 to about 25 weight percent low density polyethylene, based on polymer blend weight. Beneficially, the ethylene copolymer has polymerized therein from about 99 to about 80 weight percent of copolymer weight ethylene and from about 1 to about 20 weight percent of copolymer weight of a higher alkene having from 6 to 15 carbon atoms. Desirably, the ethylene copolymer has polymerized therein from about 92 to about 97 weight percent of copolymer weight ethylene and from about 8 to about 3 weight percent of copolymer weight octene.

The following examples illustrate the manner in which the principles of the invention are applied but are not to be construed as limiting the scope of the invention. All parts and percentages are on a weight basis unless otherwise stated.

PREPARATION OF EXTRUDED POLYSTYRENE FOAM

The polystyrene foams discussed in these examples were prepared by the following procedures. Particulate polystyrene homopolymer (and in some instances particulate or pelletized recycle material) was thoroughly admixed with additives and extruded to form a foamed bound one inch in thickness and 12 inches in width. The additives included 12 percent by weight based on polymer weight of a blowing agent which comprised 50 parts of difluorodichloromethane and 50 parts of methyl chloride; 0.12 parts per hundred parts of polymer of barium stearate as an extrusion lubricant, 1.6 parts per hundred parts of polymer of pentabromo monochloro cyclohexane as a flame retardant (ingredients which offer partial flame proofing, it being recognized that most organic materials which include a flame retardant will burn when exposed to sufficiently high temperatures); 0.2 parts per hundred parts of polymer of talc and 0.5 parts per hundred parts of polymer of Indigo as cell nucleating agents, and 0.03 parts per hundred parts of polymer of magnesium oxide as an acid adsorber. The extrusion rate was 200 pounds per hour. The die pressure was 350 pounds per square inch. The gel temperature within the extruder was 225° C. Immediately prior to extrusion within the die, the temperature of the extruded polystyrene gel was lowered to 120° C. The gel was extruded from an orifice having a width of 4 inches and a height of 0.05 inch. Immediately adjacent the orifice were a pair of forming plates spaced on either side of the die opening. The plates had a length of 16 inches and were covered with a thin coating of polytetrafluoroethylene. Adjacent the ends of the orifice and disposed between the forming plates were two deflecting plates and about 1¼ inches in length and diverging outwardly from the die opening at angles of about 45°. The extrudate was a continuous board having a density of 2.04 pounds per cubic foot and a cell size (i.e., the average diameter of the cells) of about 0.30 millimeter.

ADHESIVE FILM COMPOSITIONS

Two layer adhesive films having compositions as detailed below were then hot roll laminated using conventional technology under either Lamination Condition AA (line speed of 115 feed per minute and nip roll temperature of 307° Fahrenheit (°F.) or Lamination Condition AB (line speed of 71 feet per minute and nip roll temperature of 300° F.). Each adhesive film had a base layer having a thickness of 1.7 mils and a skin layer having a thickness of 0.3 mil. Ingredients used in preparing the various adhesive films are tabulated in Table I. Actual adhesive film formulations are tabulated in Table II. Some of the polyolefin components listed in Table I were not used in preparing the adhesive films tabulated in Table II but were used in evaluating solvent resistance of polystyrene foams having incorporated therein varying amounts of polyolefin components (see Table VI and samples A–F and 11–24).

TABLE I

| Polyolefin Components | |
|---|---|
| Code | Component |
| A | Ethylene - copolymer having polymerized therein 9% octene based on copolymer weight. Melt Index 2.3 decigrams/minute (dg/min) (ASTM D-1238 Condition E). Density .917 grams/cubic centimeter (g/cc) (ASTM D-792). |
| B | Low density polyethylene. Melt Index 0.7 dg/min (ASTM D-1238, Condition E). Density 0.922 g/cc (ASTM D-792). |
| C | Low density polyethylene. Melt Index 1.95 dg/min (ASTM D-1238, Condition E). Density 0.919 g/cc (ASTM D-792). |
| D | Low density polyethylene. Melt Index 5.5 dg/min (ASTM D-1238, Condition E). Density 0.916 g/cc (ASTM D-792). |

| Code | Additive |
|---|---|
| E | An ethylene-vinyl acetate copolymer having polymerized therein 28% of copolymer weight vinyl acetate. Melt Index 6 dg/min (ASTM D-1238). Density 0.95 g/cc (ASTM D-792). Commercially available from E. I. duPont de Nemours & Co. under the trade designation EVA 3175. |
| F | An ethylene-vinyl acetate copolymer having polymerized therein 18% of copolymer weight vinyl acetate. Melt Index 8 dg/min (ASTM D-1238). Density a 0.94 g/cc (ASTM D-792). Commercially available from E. I. duPont de Nemours & Co. under the trade designation EVA 3174. |
| G | An ethylene-vinyl acetate copolymer having polymerized therein 8.5% of copolymer weight vinyl acetate. Melt Index 7 dg/min. (ASTM D-1238). Density 0.93 g/cc (ASTM D-792). Commercially available from E. I. duPont de Nemours & Co. under the trade designation EVA 3124. |
| H | An additive comprising 5 percent of additive weight silicon dioxide and 95 percent of additive weight of C (described above). |
| I | An additive comprising 10 percent of additive weight silicon dioxide and 90 percent of additive weight of C (described above). |
| J | An additive comprising 15 percent of additive weight of 2-hydroxy-4-n-octoxy-benzophenone, an ultraviolet light stabilizer commercially available from American Cyanamid Co. under the trade designation CYASORB ® UV 531, 5 percent of additive weight of dilauryl thiodipropionate, an antioxidant commercially available from American Cyanamid under the trade designation CYANOX ® LTDP and 80 percent of additive weight of C (described above). |
| K | An additive comprising 7.5 percent of additive weight of [2,2'-thiobis(4-t-octyl phenylato)]-n-butylamine-nickel, an ultraviolet light stabilizer commercially available under the trade designation CYASORB ® UV 1084 from American Cyanamid Co., 7.5 percent of additive weight of CYASORB ® UV 531, 1.5 percent of additive weight of 2,2'-methylenebis(4-methyl-6-t-butylphenol) an antioxidant commercially available under the trade designation CYANOX ® 2246 from American Cyanamid Co., 3.0 percent of additive weight of CYANOX ® LTDP, and 80.5 percent of additive weight of C (described above). |
| L | An additive comprising 10 percent of additive weight silicon dioxide, 2 percent of additive weight stearamide and 88 percent of additive weight C (described above). |
| M | An additive comprising 2 percent of additive weight erucylamide and 98 percent of additive weight C (described above). |
| N | High density polyethylene having a density of 0.965 g/cc (ASTM D-792), a nominal melt index of 0.9 dg/min (ASTM D-1238, Condition E). |
| O | High density polyethylene having a density of 0.964 g/cc (ASTM D-792), a melt index of 5 dg/min (ASTM D-1238, Condition E). |

TABLE II

| | Adhesive Film Formulations | | | | | | | | |
|---|---|---|---|---|---|---|---|---|---|
| Adhesive | Basic Layer (weight percent of layer) | | | | Skin Layer (weight percent of layer) | | | | |
| Film No. | A | B | H | I | K | F | H | I | J | K |
| 1 | 70.7 | 20 | 4 | | 5.3 | 96 | 4 | | | |
| 2 | 72.7 | 20 | | 2 | 5.3 | 98 | | 2 | | |

LAMINATION OF ADHESIVE FILM TO EXTRUDED POLYSTYRENE FOAM

Lamination of an adhesive film to at least one major surface of extruded polystyrene foam boards is accomplished using conventional hot roll lamination apparatus and techniques. Such lamination is accomplished herein under one of two conditions hereinabove set forth (Condition AA or Condition AB).

| Physical Property Test Methods for Evaluating Foam Material | |
|---|---|
| Compressive Strength | ASTM D-1621 |
| R-Value | ASTM C-518 |
| Compressive Modulus | ASTM D-1621 |
| Flex Strength | ASTM C-203 |
| Flex Modulus | ASTM C-203 |

Percent Adhesive Film in Foam—Calculated on a Mass Balance basis-knowing the weight of the Adhesive film with respect to weight of the laminate used as recycle material and knowing the amount of recycle material used, one can calculate the amount of adhesive film present in the foam.

Foam Density—Calculated based on weight and dimensions of a foam sample—pounds per cubic foot (pcf).

Polymer Solution Viscosity—Viscosity of a 10 percent solution in toluene at 25° Centigrade in centipoise.

PEEL STRENGTH (ADHESION OF ADHESIVE FILM TO EXTRUDED FOAM)

Samples having a size of 3 inches by 6 inches, the latter dimension being in the extrusion direction, were cut from laminated boards prepared as above with an adhesive film laminated to two major surfaces, nominally a top side and a bottom side. The samples were taken from the left edge (L), and the center (C) and the right edge (R) of the laminated board. A 1 inch by 6 inch strip was then cut from the middle of the samples. The film was then manually stripped for a distance of 3 inches on either the top side of the bottom side to produce a tab. The foam samples were then placed in a testing machine, a Model 1130 Tensile Tester available from Instron Corp. The testing device had a load cell with a 5000 gram range (5 grams/chart division) a crosshead speed of 10 inches per minute and a chart speed of 10 inches per minute. The tab was placed in one set of jaws of the device while the portion of the foam sample from which film had been stripped was placed in a second set of jaws. Peel strength in grams was then measured as the device operated to strip the remaining film from the sample of laminated board at an angle of 180 degrees. Peel strength measurements were taken from either the top side, the bottom side or both sides (average values reported). Persons skilled in the art will recognize that peel strengths will vary depending upon the location from which the sample is taken.

FOAM CELL SIZE

Foam cell sizes were determined by cutting a thin slice of foam from an extruded foam board, placing the foam slice in front of a magnifying light source, such as a slide projector, and thereafter counting the number of cell walls from which the cell size can then be calculated. Cell size measurements were made in three directions: Vertical (V) or thickness, Horizontal (H) or width and Extrusion (E) or length.

PREPARATION OF RECYCLE FEEDSTREAM

Laminated polystyrene foam prepared as detailed above was recovered by known methods of foam scrap recovery to simulate recycle of foam scrap material. The laminated foam was first comminuted or ground to a suitable size with a hammer mill. A suitable size was from about ½ inch to about 1 inch in diameter. The ground foam was then passed through a devolatilizing extruder and subsequently pelletized. The devolatilizing extruder was a reverse driven devolatilizing extruder commercially available from Egan Machinery Co., Division of Leesona Corp. The extruder had three zones, a first zone having a length of 38 inches and a diameter of 14 inches, a second zone having a length of 24 inches and a decreasing tapered diameter which decrease from a diameter of 14 inches to a diameter of 8 inches, and a third zone having a length of 184 inches and a diameter of 8 inches. Extrudate from the extruder was passed through a water bath for cooling. After cooling the extrudate was pelletized into pellets having a length of 4 to 5 millimeters (mm) and a diameter of about 3 mm.

EXAMPLES 1-5

The pellets so formed were then mixed with virgin polystyrene pellets and other foamable ingredients to prepare an extruded foam having incorporated therein an amount of recycle material.

EXAMPLES 1-3

Preparation of Foam and Foam Laminates

Foam samples containing varying amounts of recycle material were prepared as detailed above under the heading "Preparation of Extruded Polystyrene Foam" except that an amount of Recycle Material prepared as detailed above under the heading "Preparation of Recycle Feedstream" replaced a portion of the polymer. For purposes of comparison, a sample (Sample A) was prepared as detailed above which contained no recycle material and, accordingly, no alpha-polyolefin material. Physical Property Evaluations of such foam samples taken in accordance with the methods set forth above under the heading "Physical Property Test Methods for Evaluating Foam Material" are set forth in Tables III A–C which follow.

TABLE IIIA

| | | | | Foam Sample Physical Property Evaluations | | | | | | | |
|---|---|---|---|---|---|---|---|---|---|---|---|
| Sample/* Example | % Adhesive Film | Foam Density (pcf) | Foam Cell Size V/H/E | Polymer Solution Viscosity | Compressive Strength | | | | Peel Strength | | |
| | | | | | V | H | E | Total | L | C | R |
| A | 0 | 2.04 | 0.32/0.30/ | 10.2 | 36.8 | 30.8 | 60.0 | 127.8 | — | — | — |

TABLE IIIA-continued

Foam Sample Physical Property Evaluations

| Sample/* Example | % Adhesive Film | Foam Density (pcf) | Foam Cell Size V/H/E | Polymer Solution Viscosity | Compressive Strength V | H | E | Total | Peel Strength L | C | R |
|---|---|---|---|---|---|---|---|---|---|---|---|
| AL | — | — | 0.32 0.35/0.34/ 0.41 | — | 31.9 | 30.1 | 66.6 | 128.6 | 287 | 268 | 203 |
| 1 | 4.0 | 2.00 | 0.61/0.48/ 0.65 | 11.1 | 26.8 | 25.9 | 69.5 | 122.2 | — | — | — |
| 1L | — | — | 0.53/0.50/ 0.62 | — | 24.2 | 25.8 | 71.7 | 121.7 | 270 | 297 | 290 |
| 2 | 5.1 | 2.03 | 0.54/0.44/ 0.50 | 10.2 | 25.0 | 25.0 | 76.7 | 126.7 | — | — | — |
| 2L | — | — | 0.54/0.49/ 0.60 | — | 21.7 | 25.1 | 77.7 | 124.5 | 298 | 238 | 330 |
| 3 | 5.6 | 2.06 | 0.45/0.42/ 0.55 | 9.6 | 29.2 | 27.7 | 71.5 | 128.4 | — | — | — |

*L indicates laminate
— Not measured

TABLE IIIB

Foam Sample Physical Property Evaluations

| Sample/* Example | R-Value Fresh | 30 Days at 140° F. | 60 Days at 140° F. | 90 Days at 140° F. | Compressive Modulus V | H | E |
|---|---|---|---|---|---|---|---|
| A | 5.27 | 5.22 | 5.29 | 5.15 | 1135 | 865 | 1217 |
| AL | 5.28 | 5.20 | 5.11 | 5.19 | 1053 | 548 | 1266 |
| 1 | 4.99 | 4.95 | 4.97 | 4.87 | 912 | 735 | 1471 |
| 1L | 4.99 | 4.92 | 4.88 | 4.90 | 701 | 652 | 1196 |
| 2 | 5.09 | 4.96 | 4.97 | 4.92 | 787 | 723 | 1481 |
| 2L | 4.95 | 4.85 | 4.85 | 4.81 | 618 | 595 | 1270 |
| 3 | 5.28 | 5.22 | 5.24 | 5.21 | 848 | 700 | 1321 |

*L indicates laminate

TABLE IIIC

Foam Sample Physical Property Evaluations

| Sample/* Example | Flex Strength Machine Direction | Cross Direction | Flex Modulus Machine Direction | Cross Direction |
|---|---|---|---|---|
| A | 136.3 | 65.1 | 5125 | 2656 |
| AL | 141.8 | 73.3 | 4997 | 2546 |
| 1 | 117.5 | 57.0 | 6343 | 2059 |
| 1L | 141.2 | 61.8 | 5647 | 1889 |
| 2 | 111.8 | 51.3 | 6592 | 1765 |
| 2L | 148.8 | 58.8 | 6341 | 1771 |
| 3 | 124.5 | 59.3 | 6072 | 2115 |

*L indicates laminate

Additional peel strength evaluations were made of freshly laminated polystyrene foam prepared in accordance with the present invention (numbered samples). Comparative examples were prepared as detailed above but without any recycle material containing adhesive film (lettered samples). Results of such evaluations are tabulated in Table IV together with results for Samples A, L and 2L extracted from Table IIIA.

TABLE IV

Peel Strength Evaluations

| Sample No. | % Adhesive Film | Peel Strength L | C | R | Average | Lamination Conditions | Measurement Side |
|---|---|---|---|---|---|---|---|
| B | 0 | 115 | 105 | 100 | 107 | AA | Top |
| C | 0 | 123 | 110 | 105 | 113 | AA | Bottom |
| A | 0 | 287 | 268 | 203 | 253 | AB | Both (average) |
| 4 | 1 | 200 | 140 | 150 | 163 | AA | Top |
| 5 | 1 | 150 | 190 | 205 | 182 | AA | Bottom |
| 1L | 4 | 270 | 297 | 290 | 285 | AB | Both (average) |
| 2L | 5 | 298 | 238 | 330 | 289 | AB | Both (average) |

An examination of the data presented in Tables III and IV clearly shows that recycle of foam scrap material containing adhesive film or a blend of polyolefin materials is feasible and that suitable foams are produced. Foam physical properties are either retained within acceptable levels or improved as in the case of peel strength when up to about 5.6 percent by weight of resin of adhesive film or blend of polyolefin materials is incorporated into the foam formulation. Similar results are obtained by incorporating into the foam formulation larger amounts of polyolefin materials so long as permeability characteristics of the polystyrene foam including polyolefin materials are not significantly reduced to a point where the foam material is no longer suitable for insulation purposes.

Similar foams are produced by varying the composition of the adhesive film which is part of the recycle material incorporated in foam materials prepared as detailed herein. Suitable foams are also produced when a blend of polyolefin materials having the same composition as the adhesive film is added directly to virgin polystyrene resin rather than being added as part of a recycle stream.

ULTRAVIOLET LIGHT STABILITY OF FOAM

Samples of polystyrene foam were prepared as detailed above containing either no adhesive film faced polystyrene foam recycle (Sample D), or an amount of adhesive film faced polystyrene foam sufficient to incorporate into the foam a specified amount of adhesive film based on foam weight (4% by weight adhesive film—Sample 6; 5% by weight adhesive film—Sample 7; and 5.6% by weight adhesive film—Sample 8). These samples were evaluated for ultraviolet light stability using a colorimeter with Hunter L, a, b color system commercially available from Neotec Instruments, Inc. under the trade designation Tru-Color Model 124I. A color standard tile supported by Neotec Instruments, Inc. was used to calibrate the instrument.

The foam samples were in the shape of cubes measuring about four inches on each side. The samples were prepared so that each cut surface was cut with a meat slicer. It had been found that surfaces prepared with a hot wire cutter or a bandsaw were not satisfactory.

In operation of the colorimeter, a sample is placed on a sample holder and illuminated by a light source. Reflected light from an illuminated foam sample is passed through three optical filters and thereafter converted into electrical signals by photodetectors. The signals from the photodetectors are then processed by computational circuitry into three signals L, a and b that simulate human visual response. A positive L value represents white whereas a negative L value represents black. A positive a value represents red whereas a negative a value represents green. A positive b value represents yellow whereas a negative b value represents blue. As the value becomes either more positive or more negative, the color represented by that value becomes more intense.

Samples D and 6 through 8 were evaluated when freshly prepared and after a 10-hour exposure to an ultraviolet light source. Data collected from these evaluations is tabulated in Table V.

TABLE V

| | Ultraviolet Light Stability | | | | | |
|---|---|---|---|---|---|---|
| | Initial | | | After 10 Hour Exposure | | |
| Sample | L | b | a | L | b | a |
| D | 78 | −3.1 | −3.4 | 78.1 | 3.1 | −5.0 |
| 6 | 74.3 | −2.0 | −4.4 | 73.9 | 1.4 | −4.7 |
| 7 | 73.1 | −1.6 | −4.6 | 73.3 | 1.8 | −4.8 |
| 8 | 73.2 | −2.7 | −4.7 | 72.8 | 1.8 | −5.3 |

The data present in Table V clearly shows that polystyrene foams having incorporated therein an amount of adhesive film recycle material have increased stability when compared to a polystyrene foam having no such recycle material. Such stability is indicated by lower absolute positive b values and by lower net change in b values. As noted above, a positive b value indicates a yellow color.

Similar results are obtained by varying the amount and composition of adhesive film recycle material incorporated in polystyrene foams prepared in accordance with the present invention. Similar results are also obtained with other vinyl aromatic polymers. In addition, similar results are obtained when a blend of alpha-olefin polymers having generally the same composition as the adhesive films is incorporated in polystyrene or polyvinyl aromatic foam materials in place of the adhesive film recycle material.

SOLVENT RESISTANCE OF POLYSTYRENE FOAMS CONTAINING VARYING AMOUNTS OF OLEFIN POLYMERS

A number of foam samples containing varying amounts of one or more polyolefin additives were prepared in generally the same manner as detailed above under the heading "Preparation of Extruded Polystyrene Foam" except that an extrusion temperature of about 120° Centigrade, a die pressure of from about 500 to about 550 pounds per square inch, an extruder rate of either 150 pounds per hour or 200 pounds per hour and a die slot of 4 inches by about 0.055 inch were used to prepare a foam board having a width of from about 7 to about 10 inches and a thickness of from about 1 to about 15 inches. Samples measuring about 7 inches by about 10 inches were cut from the foam boards so prepared. The latter dimension was in the extrusion direction.

Each of the foam samples was sprayed with about 3 grams of solvent-based glue using a Divilbiss spray gun-type J.G.A. 502 equipped with a spray heat #770 and opeating at an atomizer pressure of 60 pounds per square inch. The glue was a neoprene-phenolic resin blend in a mixture of solvents, the mixture containing 41 percent hexane, 36.5 percent acetone and 4 percent toluene, all based on glue weight. The glue was commercially available from Swift Adhesive and Coatings under the trade designation Swift's glue #7375.

Two to three hours after the samples were sprayed, the samples were evaluated for solvent resistance. The solvent resistance of each sample was determined by the following criteria:

5—Poor Solvent Resistance—Glue/adhesive penetrates the surface skin of the foam, forming pits and depressions.
3—Fair to Good Solvent Resistance—Limited penetration of the surface skin of the foam. Most of the glue beads up on the surface skin.
1—Excellent Solvent Resistance—Essentially no penetration of the surface skin of the foam. The glue beads up on the surface skin.

Results of the solvent resistance testing are tabulated in Table VI which follows. The polyolefin additives used are set forth in Table I above. All additives are in terms of percent by weight of foam. Samples which are for comparative purposes only are lettered whereas samples representative of the present invention are numbered.

TABLE VI

| | Solvent Resistance | | |
|---|---|---|---|
| | Additive | | Solvent Resistance |
| Sample | Type | % | Rating |
| E | B | 1 | 5 |
| F | A | 0.23 | 5 |
| | F | 0.03 | |
| G | — | — | 5 |
| H | A | 0.19 | 5 |
| | E | 0.6 | |
| I | A | 0.19 | 5 |
| | G | 0.6 | |
| J | A | 0.15 | 5 |
| | F | 0.1 | |
| 9 | D | 1.8 | 3 |
| | F | 1.2 | |
| 10 | A | 1.8 | 3 |
| | E | 1.2 | |
| 11 | A | 3 | 1 |
| | F | 2 | |
| 12 | N | 2.25 | 1 |
| | F | 0.75 | |
| 13 | A | 2.25 | 1 |
| | F | 0.15 | |
| 14 | A | 4.5 | 1 |
| | F | 0.5 | |
| 15 | B | 2.25 | 1 |
| | F | 0.15 | |
| 16 | A | 3.75 | 1 |
| | E | 1.25 | |
| 17 | O | 2.25 | 1 |
| | F | 0.75 | |
| 18 | C | 1.8 | 1 |
| | F | 1.2 | |
| 19 | C | 2.25 | 1 |
| | F | 0.75 | |
| 20 | A | 1.8 | 1 |
| | G | 1.2 | |
| 21 | A | 3.75 | 1 |

TABLE VI-continued

| Sample | Additive Type | Solvent Resistance % | Solvent Resistance Rating |
|---|---|---|---|
| 22 | G | 1.25 | |
| | B | 1.8 | 1 |
| | F | 1.2 | |

From the data presented in Table VI it is readily apparent that an improvement in solvent resistance is observed when at least 2.4 percent by weight of polyolefin additives, based upon weight of the foam, are incorporated into polystyrene foam. It is also apparent that lesser amounts of polyolefin additives may produce an improvement in solvent resistance so long as an amount of greater than about 0.3 percent by weight of additives based on weight of foam is added. Similar results are obtained when the source of polyolefin is a recycle stream based on recycled polystyrene foam board having at least one adhesive film facer, as described herein, rather than virgin polyolefin resin.

What is claimed is:

1. A foamable polyvinyl aromatic composition comprising a major amount of vinyl aromatic polymer and a compatible amount of an alpha-olefin polymer, wherein the alpha-olefin polymer is a mixture of alpha-olefin polymers which comprises from about 0.5 to about 40 weight percent, based on the mixture of alpha olefin polymer weight, of a copolymer of ethylene and vinyl acetate having polymerized therein from about 8.5 to about 28 percent by weight vinyl acetate, based on copolymer weight, and from about 100 to about 60 weight percent, based on mixture weight, of a blend of ethylene homopolymers and copolymers, the blend comprising from about 68 to about 75 weight percent of a copolymer of ethylene and a higher alkene having from 3 to 20 carbon atoms, based on the blend of alpha olefin polymer weight, and from about 32 to about 25 weight percent low density polyethylene, based on the blend of alpha olefin polymer weight said composition containing a blowing agent.

2. The foamable composition of claim 1 wherein the compatible amount is that amount which will result in the foamable composition having incorporated therein from about 2 to about 6 percent by weight of composition weight of alpha-olefin polymer.

* * * * *